US007011893B2

(12) United States Patent
Hodgson et al.

(10) Patent No.: US 7,011,893 B2
(45) Date of Patent: Mar. 14, 2006

(54) METALLIC LAYER WITH REGIONS OF VARYING MATERIAL THICKNESS, METHOD FOR PRODUCING SUCH A METALLIC LAYER AND HONEYCOMB BODY AT LEAST PARTLY PRODUCED FROM SUCH METALLIC LAYERS

(75) Inventors: Jan Hodgson, Troisdorf (DE); Kait Althöfer, Wiehl (DE); Arndt-Udo Rolle, Siegburg (DE)

(73) Assignee: EMITEC Gesellschaft fuer Emissionstechnologie MbH, Lohmar (DE)

( * ) Notice: Subject to any disclaimer, the term of this patent is extended or adjusted under 35 U.S.C. 154(b) by 0 days.

(21) Appl. No.: 11/049,519

(22) Filed: Feb. 2, 2005

(65) Prior Publication Data

US 2005/0137087 A1 Jun. 23, 2005

Related U.S. Application Data

(63) Continuation of application No. PCT/EP03/007432, filed on Jul. 9, 2003.

(30) Foreign Application Priority Data

Aug. 2, 2002 (DE) ................................ 102 35 767
Mar. 28, 2003 (DE) ................................ 103 14 084

(51) Int. Cl.
*B32B 3/12* (2006.01)
*B01J 32/00* (2006.01)
*B01J 35/04* (2006.01)
*B01D 53/34* (2006.01)
*B21D 13/10* (2006.01)

(52) U.S. Cl. ...................... 428/593; 428/595; 428/600; 428/603; 502/439; 502/527.22; 72/379.6; 29/890

(58) Field of Classification Search ................ 428/593, 428/595, 600, 603, 604, 613, 608, 605; 502/439, 502/527.22; 72/379.6; 29/890; 228/181, 228/190
See application file for complete search history.

(56) References Cited

U.S. PATENT DOCUMENTS 1,886,830 A * 11/1932 Murray, Jr. ............... 219/91.23
3,618,778 A * 11/1971 Benton et al. ............... 210/150
3,967,354 A *  7/1976 Jaspers .................. 29/890.039

(Continued)

FOREIGN PATENT DOCUMENTS

DE            44 09 026 A1    11/1995

(Continued)

*Primary Examiner*—John J. Zimmerman
(74) *Attorney, Agent, or Firm*—Laurence A. Greenberg; Werner H. Stemer; Ralph E. Locher (57) ABSTRACT

A process for producing a metallic layer includes forming structures at least in subregions of the metallic layer. The structures have corrugation troughs and corrugation peaks, an upper bearing surface formed at least in part from the peaks, and a lower bearing surface formed at least in part from the troughs. The metallic layer is formed with at least a first region having a first thickness and a second region having a second thickness, different than the first thickness. The structures are formed, in longitudinal direction, independently of the thickness, with at least one of the upper and lower bearing surfaces in the regions being substantially aligned in longitudinal direction in vicinity of at least one of the peaks and the troughs. A metallic layer with regions of varying material thickness and a honeycomb body produced at least partly from such metallic layers, are also provided.

34 Claims, 3 Drawing Sheets

U.S. PATENT DOCUMENTS

| | | | |
|---|---|---|---|
| 4,225,540 A * | 9/1980 | Kauschke | 261/112.2 |
| 4,228,847 A * | 10/1980 | Lindahl | 96/144 |
| 4,241,146 A * | 12/1980 | Sivachenko et al. | 428/600 |
| 4,273,836 A * | 6/1981 | Campbell et al. | 428/595 |
| 4,832,998 A | 5/1989 | Cyron | |
| 4,923,109 A | 5/1990 | Cyron | |
| 5,084,361 A * | 1/1992 | Toyoda et al. | 428/593 |
| 5,105,539 A | 4/1992 | Maus et al. | |
| 5,139,844 A | 8/1992 | Maus et al. | |
| 5,157,010 A | 10/1992 | Maus et al. | |
| 5,240,682 A * | 8/1993 | Cornelison et al. | 422/174 |
| 5,468,455 A | 11/1995 | Brück | |
| 6,036,926 A | 3/2000 | Wieres | |
| 6,057,263 A * | 5/2000 | Takahashi et al. | 502/439 |
| 6,316,121 B1 | 11/2001 | Maus | |
| 6,613,446 B1 | 9/2003 | Peters et al. | |
| 6,660,401 B1 * | 12/2003 | Hsu | 428/593 |

FOREIGN PATENT DOCUMENTS

| | | |
|---|---|---|
| EP | 0 245 737 A1 | 11/1987 |
| EP | 0 430 945 B1 | 6/1991 |
| EP | 0 855 936 B1 | 8/1998 |
| JP | 63-240952 | 10/1988 |
| WO | 90/03220 | 4/1990 |
| WO | 90/08249 | 7/1990 |
| WO | 99/31362 | 6/1999 |
| WO | 99/56010 | 11/1999 |

* cited by examiner

METALLIC LAYER WITH REGIONS OF VARYING MATERIAL THICKNESS, METHOD FOR PRODUCING SUCH A METALLIC LAYER AND HONEYCOMB BODY AT LEAST PARTLY PRODUCED FROM SUCH METALLIC LAYERS

CROSS-REFERENCE TO RELATED APPLICATION

This is a continuing application, under 35 U.S.C. § 120, of copending International Application No. PCT/EP2003/007432, filed Jul. 9, 2003, which designated the United States; this application also claims the priorities, under 35 U.S.C. § 119, of German Patent Application 102 35 767.6, filed Aug. 2, 2002, and German Patent Application 103 14 084.0, filed Mar. 28, 2003; the prior applications are herewith incorporated by reference in their entirety.

BACKGROUND OF THE INVENTION

FIELD OF THE INVENTION

The invention relates to a structured metallic layer which has regions of different material thicknesses. The invention also relates to a process for producing such metallic layers. The invention additionally relates to a honeycomb body which is at least partially constructed from such metallic layers.

Honeycomb bodies are in widespread use, for example as catalyst carrier bodies for converting exhaust gases from internal combustion engines, as exhaust gas filters for filtering particulates out of the exhaust gas stream from internal combustion engines or the like. Honeycomb bodies of that type are known, for example, from European Patent Application 0 245 737 A1, corresponding to U.S. Pat. No. 4,923,109 and U.S. Pat. No. 4,832,998, or European Patent Application 0 430 945 B1, corresponding to International Publication No. WO 90/03220 and U.S. Pat. Nos. 5,139,844 and 5,105,539. However, the invention can also be realized in other structural forms, e.g. helically wound forms. Forms which are conical in one direction are also known, for example from International Publication No. WO 99/56010, corresponding to U.S. Pat. No. 6,613,446. The production processes which are known for honeycomb bodies can also be applied to the present invention. Relatively recent developments relating to cell geometry have led to the use of microstructures in the passage walls, as are known, for example, from International Publication No. WO 90/08249, and from International Publication No. WO 99/31362, corresponding to U.S. Pat. No. 6,316,121. Honeycomb bodies of that type are generally produced at least from one at least partially structured metallic layer or a plurality of at least partially structured and of substantially smooth metallic layers, and often have cavities through which a fluid can flow and which may also be constructed as a passage system.

Metallic layers may, for example, be sheet-metal layers or may also be formed at least in part from a material through which a fluid can at least partly flow or is at least partially permeable to a fluid.

In order to produce a honeycomb body, differently structured metallic layers or an alternating sequence of substantially smooth and at least partially structured metallic layers are stacked and/or wound to form a honeycomb structure. If sheet-metal layers are used, those layers typically have thicknesses of less than 0.08 mm, in particular less than 0.04 mm or even less than 0.025 mm. The honeycomb structure is introduced into a tubular casing. A thermal joining process connects the metallic layers of the honeycomb structure to one another and the honeycomb structure to the tubular casing. Brazing processes are often used for that purpose. There are various possible ways of applying brazing material to those regions of the metallic layers which are to be connected, inter alia by application of a bonding agent to the corresponding regions of the metallic layers, which are then provided with brazing material in powder form that adheres to the bonding agent. When the structures are heated, the bonding agent is volatilized and a brazed connection is formed in the desired regions. During application of the bonding agent and/or the brazing material, it is possible to make use of the capillary effect in tight gaps which is brought about as a result of sheet-metal layers lying on top of one another. Other thermal joining processes, such as for example the formation of diffusion bonds, can also be employed.

In some embodiments of honeycomb bodies, the problem arises that the metallic layers from which the honeycomb bodies are produced have regions with different material thicknesses. For example, European Patent 0 855 936 B1, corresponding to U.S. Pat. No. 6,036,926, has disclosed a honeycomb body which is constructed from sheet-metal layers and has reinforcing structures which may include, for example, folded-over edges in the end region of the honeycomb body. As a result of the sheet-metal layers being folded over in the end region, regions which have a significantly increased material thickness compared to the remainder of the sheet-metal layers are formed there.

At their boundaries, those folded-over sections lead, by way of example, to the formation of cavities in which a washcoat settles when the sheet-metal layers are being coated therewith. If the honeycomb body is used as a catalyst carrier body, the washcoat contains, inter alia, a precious metal catalyst. This means that filling the cavities with washcoat does not produce a catalytically active surface onto which the exhaust gas can flow, but does cause an increased consumption of washcoat and precious metal catalysts. That increases the production costs of the catalyst carrier body.

Honeycomb bodies are often prestressed before they are introduced into a tubular casing. If sheet-metal layers or metallic layers with folded-over ends are used, they cannot be uniformly prestressed, since a prestress is formed at the axial edge but not in the center region of the metallic layers. That has an adverse effect on the connection of the metallic layers, for example during diffusion brazing and other connection techniques.

Furthermore, correspondingly constructed honeycomb bodies are also used as particulate filters. In those particulate filters, at least some of the metallic layers may be formed at least in part from a porous material, for example a fiber material.

When those filter layers are connected, for example, to sheet-metal layers for the purpose of reinforcement in particular in the edge region of the filter layers, there too a metallic layer is formed which includes regions of different material thickness and has the above-mentioned drawbacks with regard to construction of a honeycomb body in terms of the prestressing and the distribution of bonding agent and/or brazing material.

SUMMARY OF THE INVENTION

It is accordingly an object of the invention to provide a metallic layer which at least in part has structures and has regions of varying material thickness, a method for producing such a metallic layer and a honeycomb body at least partly produced from at least one such metallic layer, which overcome the hereinafore-mentioned disadvantages of the heretofore-known devices and methods of this general type.

With the foregoing and other objects in view there is provided, in accordance with the invention, a process for producing a metallic layer. The process comprises forming structures at least in subregions of the metallic layer. The structures have corrugation troughs and corrugation peaks, an upper bearing surface formed at least in part from the corrugation peaks, and a lower bearing surface formed at least in part from the corrugation troughs. The metallic layer is formed with at least a first region having a first material thickness and a second region having a second material thickness being different than the first material thickness. The structures are formed, in longitudinal direction, independently of the respective material thickness, with the upper bearing surfaces and/or the lower bearing surfaces in the first and second regions being substantially aligned in longitudinal direction in the vicinity of the corrugation peaks and/or the corrugation troughs.

A metallic layer produced by using the process has an aligned, in particular continuous, upper and/or lower bearing surface in the regions in which it bears against adjacent metallic layers when these layers are being wound to form a honeycomb body. In this case, the upper bearing surface is formed at least in part by the outer surface of the corrugation peaks and the lower bearing surface is formed at least in part by the outer surface of the corrugation troughs. When constructing a honeycomb body by alternately stacking smooth and corrugated sheet-metal layers, adjacent metallic layers touch one another substantially in the region of the bearing surfaces, with the smooth metallic layers bearing against the respectively outer surfaces of the corrugation troughs and corrugation peaks. A bearing surface without steps which is aligned in the longitudinal direction in the region of the corrugation peaks and/or the corrugation troughs is achieved by virtue of the fact that the corrugation peaks, in the two regions with different material thicknesses, in each case have substantially the same outer height and/or the corrugation troughs of the two regions with different material thicknesses in each case have substantially the same outer depth.

Independently or irrespective of the material thickness in the two regions, this allows a uniform bearing surface with respect to the adjacent metallic layer so that, for example when brazing material is being applied using known processes, a uniform distribution of brazing material or bonding agent is achieved and is not adversely affected by an interruption to the capillary effect. It is also possible to form uniformly constructed diffusion bonds.

In accordance with another mode of the invention, the region having the smaller material thickness is at least partially structured, whereas the other region is substantially smooth.

This advantageously allows the formation of metallic layers with bearing surfaces which are continuous in the longitudinal direction in the region of the corrugation peaks and/or the corrugation troughs. This is possible because the difference in thickness between the region having the greater material thickness and the region having the smaller material thickness can be compensated for by the formation of structures in the region having the smaller material thickness.

In accordance with a further mode of the invention, the first region and the second region have structures. This makes it possible, for example, to construct structured sheet-metal layers with folded-over parts which have bearing surfaces that are aligned, in particular continuous, in the region of the corrugation peaks and/or the corrugation troughs.

In accordance with an added mode of the invention, at least one of the regions is formed from a material through which a fluid can at least partly flow, preferably a metallic fiber material. The formation of metallic layers at least in part from material through which a fluid can at least partly flow advantageously makes it possible to construct open particulate filters.

A particulate filter is referred to as open if in principle all particulates can pass through it, specifically including particulates which are considerably larger than the particulates that are actually to be filtered out. Consequently, a filter of this type cannot become blocked even in the event of an agglomeration of particulates during operation. A suitable method for measuring the openness of a particulate filter is, for example, the test to ascertain up to what diameter spherical particles can still trickle through a filter of this type. For the present applications, a filter is open in particular if spheres with a diameter of greater than or equal to 0.1 mm can still trickle through it, preferably spheres with a diameter of over 0.2 mm.

In accordance with an additional mode of the invention, the structures are formed at least in part by stamping. In this context, it is particularly advantageous for the structures to be formed by corrugating and then stamping. In this way, for example, the metallic layer can be corrugated in both regions, with the outer height of the corrugation peaks and/or the outer depth of the corrugation troughs then being adapted by stamping in the region which has the thinner material thickness. This allows the formation of an upper and/or lower bearing surface which is continuous in the longitudinal direction in the region of the corrugation peaks and/or the corrugation troughs.

In accordance with yet another mode of the invention, the structures are formed by stepped corrugation.

Stepped corrugation makes it possible in a simple way to introduce structures into the metallic layer in such a manner that these structures have an upper and/or lower bearing surface which is substantially continuous in the region of the corrugation peaks and/or the corrugation troughs. For example, in the case of sheet-metal layers which are folded over in at least one of the end regions, it is possible to ensure that a bearing surface which is substantially continuous in the longitudinal direction in the region of the corrugation peaks and/or the corrugation troughs is formed.

In accordance with yet a further mode of the invention, the corrugation forms sinusoidal, square and/or triangular corrugations or waves. In particular, it is possible to compensate for differences in thickness by using different cell shapes in different regions.

These corrugation or wave shapes advantageously allow the formation of metallic layers from which a large number of different honeycomb bodies with different cell shapes and/or densities can be constructed.

In accordance with yet an added mode of the invention, the first region and the second region at least partially overlap one another in an overlap region. In this context, it is preferable for the first region and the second region to be connected to one another in the overlap region by a joining technique, preferably by thermal joining processes, in particular welding and/or brazing, and/or mechanical joining processes, in particular riveting. A joining technique can also be carried out by sintering.

This advantageously allows the two regions to be connected if they not only have different material thicknesses but also, in addition, are formed of different materials. By way of example, it is thus possible in a simple way to connect a fiber material as the first region to a metal foil as the second region.

By way of example, according to the invention it is possible for a fiber mat formed from a material through which a fluid can at least partly flow to be connected to a metal foil, through the use of a thermal joining process, to form a metallic layer. This can be done, for example, by forming a brazed joint or also a welded joint. A mechanical joining process of this type can also advantageously be combined with a thermal joining process, so that the two regions are connected to one another both by a thermal joining process and by a mechanical joining process.

With the objects of the invention in view, there is also provided a metallic layer, comprising structures disposed at least in subregions and having corrugation peaks and corrugation troughs, in particular for constructing a honeycomb body. The corrugation peaks at least in part form an upper bearing surface and the corrugation troughs at least in part form a lower bearing surface. At least a first region has a first material thickness and a second region has a second material thickness being different than the first material thickness. The structures, independently of the respective material thickness, in the first and second regions, having the upper bearing surfaces and/or the lower bearing surfaces substantially aligned or continuous in longitudinal direction in the vicinity of the corrugation peaks and/or the corrugation troughs.

A metallic layer according to the invention advantageously has bearing surfaces which are substantially continuous in the longitudinal direction in the region of the corrugation peaks and/or the corrugation troughs. Therefore, when a honeycomb body is constructed at least in part from metallic layers of this type, a uniform bearing surface relative to adjacent metallic layers is achieved.

This allows adjacent metallic layers to be connected, for example by brazing, with uniform connecting locations being formed. Moreover, it is possible to form a honeycomb body with a uniform prestress.

In accordance with another feature of the invention, the region having the smaller material thickness is at least partially structured, whereas the other region is substantially smooth.

This advantageously makes it possible to use the structuring in the thinner region of the metallic layer to compensate for the difference in thickness with respect to the thicker, substantially unstructured region.

In accordance with a further feature of the invention, the first region and the second region have structures. In this way, it is possible to form structured metallic layers with regions of different thickness.

In accordance with an added feature of the invention, the sheet-metal layer is folded over in at least one end-side end region.

A fold of this nature can advantageously be used to reinforce the metallic layer. The formation of a reinforcing structure in particular in an end-side end region serves as a mechanical protection, for example on the gas inlet side of a honeycomb body in the exhaust section of an internal combustion engine. Exhaust gas streams are often pulsating and moreover impose a high thermal load on the honeycomb body, in particular at the gas inlet side. In the case of a honeycomb body formed from metallic layers according to the invention, it is particularly advantageous to form continuous bearing surfaces with adjacent sheet-metal layers in the region of the corrugation peaks and/or the corrugation troughs, since otherwise an uneven prestress would occur over the axial length of the honeycomb body.

In accordance with an additional feature of the invention, at least one of the regions is formed from a material through which a fluid can at least partly flow, preferably a metallic fiber material.

In this context, it is possible to use both metal fibers, specifically also sintered metal fibers, as well as other fiber materials. Fiber materials of this type are used in particulate filters to filter the exhaust gases from internal combustion engines, for example during the filtering of particulates in the exhaust gas from diesel engines. These fiber materials may advantageously be reinforced, for example with metal foils. As a result, it is possible, in a simple way, to produce particulate filters at least in part from metallic layers of fiber materials and other metal sheets.

In accordance with yet another feature of the invention, the first region and the second region at least partially overlap one another in an overlap region.

This advantageously allows the two regions to be connected if they not only have different material thicknesses but also, in addition, are formed of different materials. By way of example, it is thus possible, in a simple way, for a fiber material as the first region to be connected to a metal foil as the second region.

In accordance with yet a further feature of the invention, the regions are connected to one another in the overlap region by a thermal joining process, preferably welding, in particular roll seam welding, and/or brazing.

By way of example, according to the invention it is possible for a fiber mat to be connected to a metal foil through the use of a thermal joining process. This can be achieved, for example, by forming a brazed joint or also a welded joint. Roll seam welding has proven advantageous in this context since the fiber mat is also compressed at the same time as the welded joint is being formed. Given a suitable procedure in the overlap region, this can simplify the formation of an upper and/or lower bearing surface which is substantially continuous in the longitudinal direction in the region of the corrugation peaks and/or the corrugation troughs.

In accordance with yet an added feature of the invention, the regions are connected to one another in the overlap region by a mechanical joining process, preferably riveting.

A mechanical joining process of this type can also advantageously be combined with a thermal joining process, so that the two regions are connected to one another both by a thermal joining process and by a mechanical joining process. By way of example, a type of pre-fixing can be effected by riveting, followed by a brazing or welding process.

In accordance with yet an additional feature of the invention, the structures are at least partially stamped. In this context, it is particularly advantageous for the structures to be formed by corrugation and subsequent stamping.

In accordance with again another feature of the invention, the structures are formed by stepped corrugation. Stepped corrugation advantageously allows the formation of metallic layers which in the region of the corrugation peaks and/or the corrugation troughs have an upper and/or lower bearing surface that is substantially continuous in the longitudinal direction.

In accordance with again a further feature of the invention, the corrugations are sinusoidal, triangular and/or square corrugations. Different corrugation shapes in different regions can also be used in this case to compensate for different material thicknesses.

The formation of sinusoidal, triangular and/or square corrugations advantageously allows a multiplicity of different cavity geometries and cell densities of the honeycomb body to be formed when constructing corresponding honeycomb bodies. The formation of square corrugations is particularly advantageous in this process, since the same corrugation shape with an identical corrugation amplitude and wavelength can be maintained and there is merely a sudden change in the zero position of the corrugations at the transition from the first region to the second region. This can be realized in a simple way during the construction of the structuring tools.

With the objects of the invention in view, there is additionally provided a honeycomb body, comprising metallic layers constructed according to the invention or produced by the process according to the invention.

All of the advantages which have been described in connection with the process according to the invention also apply in the same way to a metallic layer according to the invention and a honeycomb body according to the invention, and vice versa.

Other features which are considered as characteristic for the invention are set forth in the appended claims.

Although the invention is illustrated and described herein as embodied in a metallic layer with regions of varying material thickness, a method for producing such a metallic layer and a honeycomb body at least partly produced from such metallic layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

When constructing a honeycomb body using sheet-metal layers with folds at the end sides of the sheet-metal layers as are known from the prior art, a number of effects result.

First of all, if the honeycomb body is produced under prestress, that prestress is uneven in the axial direction. That leads to an uneven distribution of the brazing material due to the axially uneven capillary effect when brazing material is applied using conventional processes. Uneven bonding of the sheet-metal layers also results, for example, when diffusion bonds are being formed.

Second of all, when such sheet-metal layers are coated with washcoat, it is regularly the case that washcoat with precious metal catalyst accumulates in the fold gaps. However, that does not make any contribution to increasing the surface area onto which an exhaust gas can flow. In that respect, the precious metal catalysts in the fold gaps also do not make any contribution to increasing the efficiency of the catalytic conversion. Consequently, the washcoat with incorporated precious metal catalysts in the region of the fold gaps has to be regarded as lost.

At least the first drawback generally arises if a honeycomb body is at least partially constructed from metallic layers having regions of different thickness.

Those effects are overcome by the use of structured metallic layers according to the invention.

Figure 1:
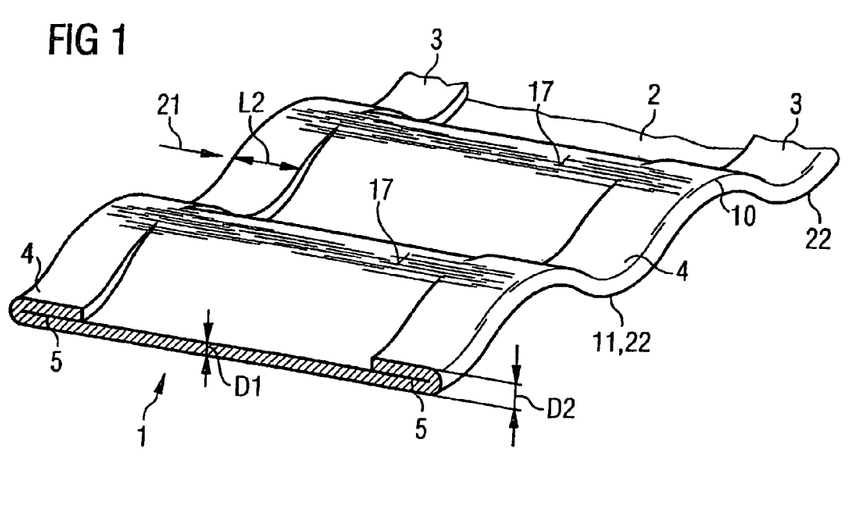
FIG. 1 is a fragmentary, diagrammatic, perspective view of a structured metallic layer according to the invention.

Referring now to the figures of the drawings in detail and first, particularly, to FIG. 1 thereof, there is seen a structured metallic layer 1 according to the invention which has a first region 2 with a thickness D1 and two second regions 3 with a respective thickness D2. In this example, the metallic layer 1 is a sheet metal layer. The second regions 3 are formed by the formation of folds 4 of a length L2 at the end side of the metallic layer 1. The folds 4 form fold gaps 5 which are substantially closed. The structured metallic layer 1 has a corrugated-type or wave-like structure including corrugation troughs or wave valleys 11 and corrugation peaks or wave peaks 10. In the region of the corrugation troughs 11 and the corrugation peaks 10, the structuring is formed in such a way that, at a transition from the first region 2 to the second region 3, the structure changes in such a way that the first region 2 and the second region 3 in each case have an identical outer depth in a corrugation trough 11 and in each case have an identical outer height in a corrugation peak 10. This leads to an upper bearing surface 17 which is continuous in a longitudinal direction 21 in the region of the corrugation peaks 10 and in the present example is formed from the outer surfaces of the corrugation peaks 10. This also leads to a lower bearing surface 22 which is continuous in the longitudinal direction 21 in the region of the corrugation troughs 11 and in the present example is formed from the outer surfaces of the corrugation troughs 11. The upper bearing surface 17 and the lower bearing surface 22 bear against adjacent metallic layers, when a honeycomb body is being constructed at least in part from metallic layers 1 of this type. A continuous bearing surface 17, 22 leads to a prestress which is uniform in the longitudinal direction 21, leading to a uniform distribution of brazing material during application of brazing material by conventional methods.

Figure 2:
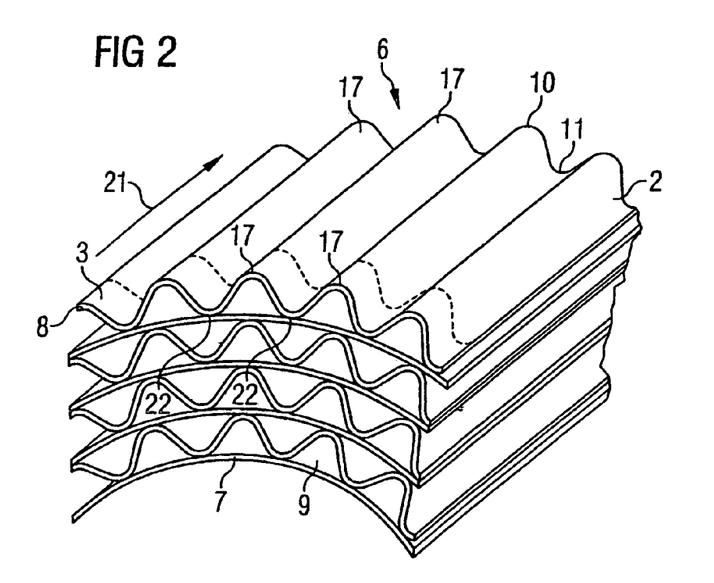
FIG. 2 is a reduced perspective view of a honeycomb structure which is constructed at least in part from structured sheet-metal layers according to the invention.

FIG. 2 shows a honeycomb structure 6 which has been constructed from smooth sheet-metal layers 7 and structured metallic layers according to the invention which are constructed as sheet-metal layers 8. The smooth sheet-metal layers 7 and the structured sheet-metal layers 8 are alternately stacked on top of one another so as to form passages 9 through which a fluid can flow. Each of the structured sheet-metal layers 8 according to the invention has corrugation peaks 10 and corrugation troughs 11. The corrugation peaks 10 form an upper bearing surface 17 and the corrugation troughs 11 form a lower bearing surface 22. In the longitudinal direction 21, the structured sheet-metal layer 8 has a first region 2 and a second region 3 which have different material thicknesses. It can be seen in the construction of the honeycomb structure 6 that the bearing surface 17, 22 between a smooth sheet-metal layer 7 and a structured sheet-metal layer 8 always includes a corrugation peak 10 or a corrugation trough 11. The smooth sheet-metal layer 7 in each case bears against the outer surface of the structured sheet-metal layer 8, i.e. the outer surface of the corrugation peak 10 or of the corrugation trough 11.

Figure 3:
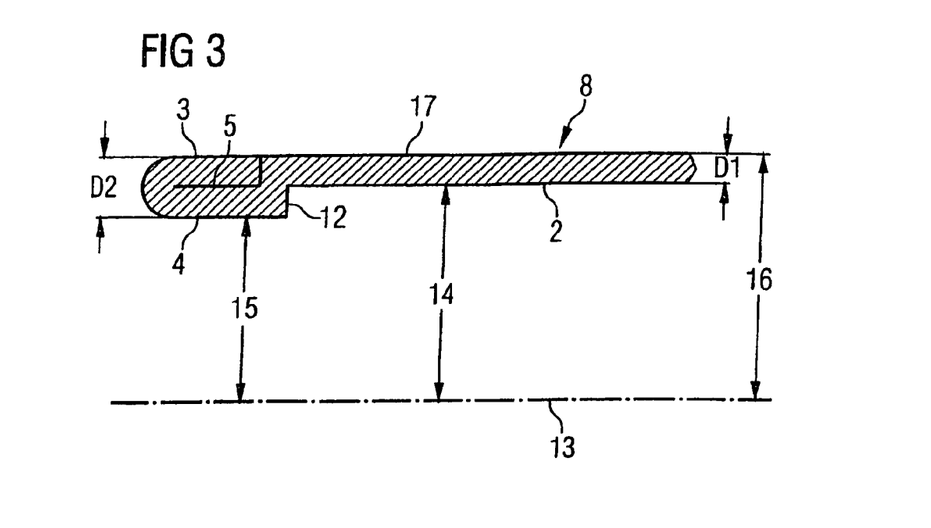
FIG. 3 is an enlarged, axial-sectional view of a structured sheet-metal layer according to the invention.

FIG. 3 shows a section through a sheet-metal layer 8 which has been structured in accordance with the invention, at the location of a corrugation peak 10. The section runs in the longitudinal direction 21. The section illustrates the structured sheet-metal layer 8, which has a first region 2 of a thickness D1 and a second region 3 of a thickness D2. The second region 3 is formed by a fold 4, and consequently the thickness D2 of the second region 3 is greater than the thickness D1 of the first region 2.

During structuring of the structured sheet-metal layer 8, a step 12 was formed, for example by using a stepped corrugation process. This step 12 leads to the height of the structure being made more uniform. The structuring has been performed in such a way that, in the first region 2, the structure has a first, inner height 14 relative to a zero crossing 13 of the corrugation, while a second inner height 15, in the region of the second region 3, is smaller than the first inner height 14. However, an outer height 16 is identical both in the first region 2 and in the second region 3. The upper bearing surface 17 formed by the corrugation peak 10, having the outer height 16 with respect to any adjacent smooth metal sheet 7, is therefore constructed without any steps. Accordingly, when constructing a honeycomb body 6, the structured sheet-metal layer 8 is surface-connected to an adjacent smooth sheet-metal layer 7, for example by forming a brazed joint. A further advantage of the sheet-metal layer according to the invention is the fact that the fold gap 5 is substantially closed, so that when the structured sheet-metal layer 8 is coated with washcoat, any accumulation of washcoat in the fold gap 5 is significantly reduced.

Furthermore, according to the invention it is possible for the fold 4, i.e. the second region 3, to be stabilized through the use of a thermal joining connection. In this context, it is recommended in particular to braze the second region 3 in the fold gap 5 or to form a weld seam, which may be produced, for example, by a roll seam welding process or a laser welding process. According to the invention, it is also possible to form a mechanical joined connection or the combination of a mechanical joined connection, e.g. by riveting, with a thermal joined connection in the region of the fold. In this way, it is advantageously possible to carry out initial fixing, for example by riveting, followed by a thermal joining process. Therefore, the riveted connection can be used as a type of preliminary fixing which is reinforced further by the formation of the thermal joined connection.

The structures of the structured sheet-metal layer 8 according to the invention can also be produced by forming a preliminary corrugation with subsequent stamping. Therefore, for example, the first region 2 may be restamped in order for the corrugation peak 10 to be formed with an identical outer height 16 in the first region 2 and in the second region 3.

Figure 4:
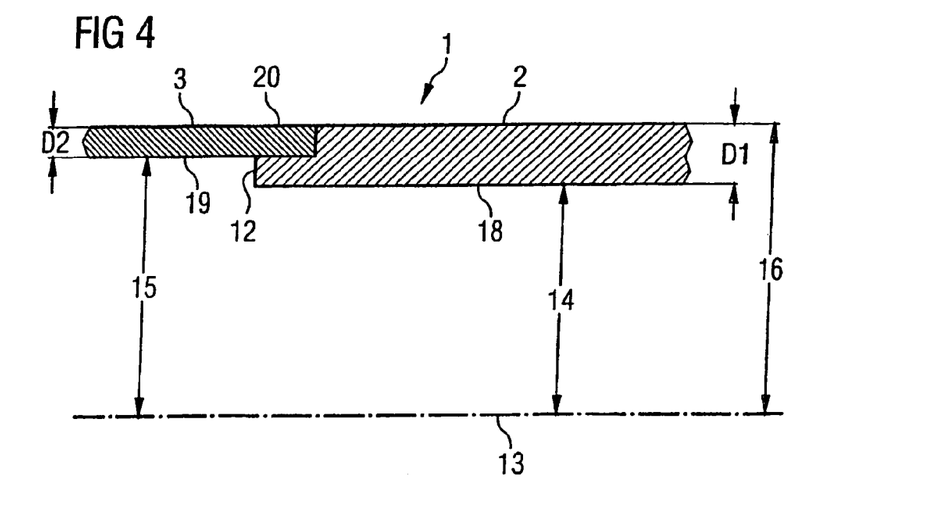
FIG. 4 is an axial-sectional view of a further exemplary embodiment of a structured sheet-metal layer according to the invention.

FIG. 4 shows a corresponding axial section in the corrugation peak 10 through a further exemplary embodiment of a metallic layer 1 which has been structured in accordance with the invention. The structured metallic layer 1 is composed of a filter layer 18 and a metal foil 19. In this case, the filter layer 18 forms the first region 2 and the metal foil 19 forms the second region 3. The filter layer 18 is a filter mat formed from a material which at least in part allows a fluid to flow through. The first region 2 has a thickness D1, whereas the second region 3 has a thickness D2. In this exemplary embodiment, the thickness D1 is greater than the thickness D2. This metallic layer 1 has also been structured and cut in the longitudinal direction 21 in a corrugation peak 10. The filter layer 18 is porous and gas can flow through it, for example in the radial direction. The stamped-in corrugation has a zero line 13. The two regions 2 and 3 have different inner heights 14, 15 with respect to the zero crossing 13 of the corrugation but a common outer height 16. The first region 2 and the second region 3 overlap in an overlap region 20. A connection by a joining technique between the filter layer 18 and the metal foil 19 has been formed in this overlap region 20. This connection by a joining technique may be produced, for example, by a welding process, preferably a resistance welding or laser welding process. In this context, it is particularly advantageous to use a roll seam welding process, since the contact pressure involved in roll seam welding can be used to compress the filter layer 18 in order to compensate for the difference in thickness between the filter layer 18 and the metal foil 19. The result of a roll seam welding process of this type is a fixed bond between the filter layer 18 and the metal foil 19. When connecting a metal foil 19 to a filter layer 18, it is also advantageously possible to form a mechanical joined connection in the overlap region 20 as an alternative or in addition to a thermal joined connection.

Figure 5:
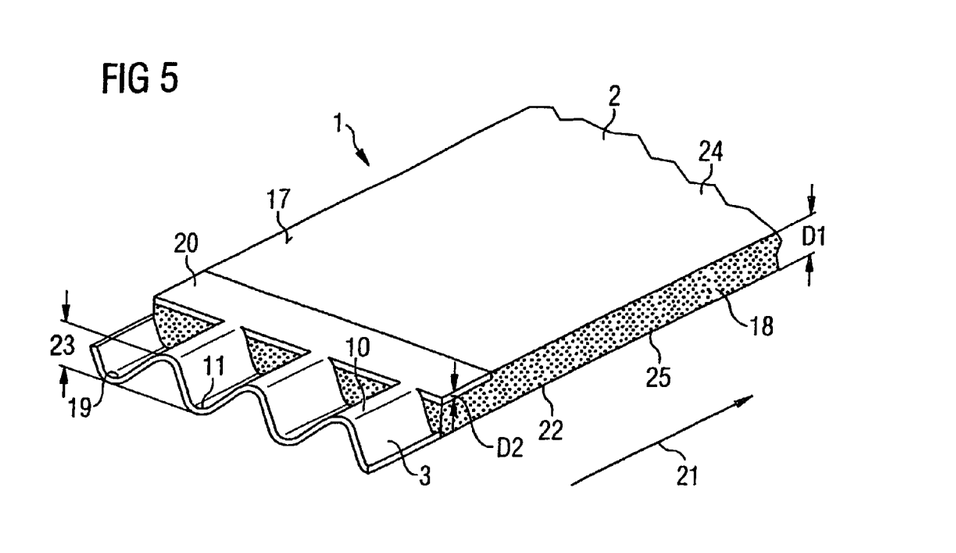
FIG. 5 is a fragmentary, perspective view of a partially structured metallic layer according to the invention.

FIG. 5 diagrammatically depicts a perspective view of a metallic layer 1 according to the invention. This metallic layer 1 has a first region 2, which is formed from a filter layer 18, for example from a metallic fiber material. The first region 2 has a thickness D1. Furthermore, a second region 3 is formed from a metal foil 19, the thickness D2 of which is considerably less than the thickness D1 of the first region 2. The first region 2 and the second region 3 overlap one another in the overlap region 20, in which the metal foil 19 and the filter layer 18 are connected to one another by a joining technique, for example by roll seam welding. The metal foil 19 is structured in a region which is not part of the overlap region 20. The structure is formed with corrugation peaks 10 and corrugation troughs 11, in such a way that a distance 23 between the outer surface of the corrugation peaks 10 and the outer surface of the corrugation troughs 11 precisely corresponds to the thickness D1. This leads to the formation of an upper bearing surface 17, which includes a top side 24 of the fiber layer 18, a top side of the overlap region 20 and the outer surfaces of the corrugation peaks 10. Therefore, an upper bearing surface 17 which is continuous in the longitudinal direction 21, i.e. does not have any sudden changes, is formed in the region of the corrugation peaks 10. In the same way, a lower bearing surface 22 which includes a lower side 25 of the fiber layer 18 and the outer surfaces of the corrugation troughs 11 and is substantially continuous in the longitudinal direction 21, is formed.

The formation of structures with corrugation peaks 10 and corrugation troughs 11 in a second region 3 therefore advantageously enables the difference in thickness between the thickness D1 of the fiber layer 18 and the thickness D2 of the metal foil 19 to be compensated for. The formation of the structures in the second region 3 may advantageously be effected by corrugation or also corrugation followed by stamping. If the filter layer 18 also has structures, a stepped corrugation process for forming the structures is also possible.

The process according to the invention and the metallic layer 1, 8 according to the invention advantageously allow the construction of honeycomb structures 6 in which the metallic layers 1, 8, despite the formation of two regions 2, 3 of different thicknesses D1, D2, are connected to adjacent metallic layers through the use of bearing surfaces 17, 22 which are substantially continuous in the axial direction in the region of the corrugation peaks 10 and/or of the corrugation troughs 11. It is therefore possible for honeycomb structures 6 to be constructed at least in part from metallic layers 1, 8 under a substantially uniform prestress.

We claim:

1. A process for producing a metallic layer, which comprises:
    forming structures at least in subregions of the metallic layer, the structures having corrugation troughs and corrugation peaks, an upper bearing surface formed at least in part from the corrugation peaks, and a lower bearing surface formed at least in part from the corrugation troughs;
    forming the metallic layer with at least a first region having a first material thickness and a second region having a second material thickness being different than the first material thickness; and
    forming the structures, in longitudinal direction, independently of the respective material thickness, with the upper bearing surface and the lower bearing surface in the first and second regions being substantially aligned in longitudinal direction in vicinity of the corrugation peaks and the corrugation troughs respectively.

2. The process according to claim 1, wherein one of the first and second regions having a smaller material thickness is at least partially structured, and the other of the first and second regions is substantially smooth.

3. The process according to claim 1, wherein the first region and the second region have structures.

4. The process according to claim 1, which further comprises forming at least one of the first and second regions from a material through which a fluid can at least partly flow.

5. The process according to claim 4, wherein the material through which a fluid can at least partly flow is a metallic fiber material.

6. The process according to claim 1, which further comprises folding over the metallic layer in at least one of the first and second regions.

7. The process according to claim 1, which further comprises at least partly forming the structures by stamping.

8. The process according to claim 7, which further comprises forming the structures by corrugating and then stamping.

9. The process according to claim 1, which further comprises forming the structures by stepped corrugating.

10. The process according to claim 1, which further comprises forming the structures by corrugating at least one shape selected from the group consisting of sinusoidal, square and triangular corrugations.

11. The process according to claim 10, which further comprises corrugating different shapes in the first region and in the second region.

12. The process according to claim 1, which further comprises at least partially overlapping the first region and the second region in an overlap region.

13. The process according to claim 12, which further comprises connecting the first region and the second region to one another in the overlap region by a joining technique.

14. The process according to claim 13, which further comprises carrying out the joining technique as a thermal joining process selected from the group consisting of welding and brazing.

15. The process according to claim 13, which further comprises carrying out the joining technique as a mechanical joining process.

16. The process according to claim 13, which further comprises carrying out the joining technique by riveting.

17. A metallic layer, comprising:
    structures disposed at least in subregions, said structures having corrugation peaks and corrugation troughs, said corrugation peaks at least in part forming an upper bearing surface and said corrugation troughs at least in part forming a lower bearing surface; and
    at least a first region having a first material thickness and a second region having a second material thickness being different than said first material thickness;
    said structures, independently of said respective material thickness, in said first and second regions, having the upper bearing surface and the lower bearing surface substantially aligned in longitudinal direction in vicinity of said corrugation peaks and said corrugation troughs respectively.

18. The metallic layer according to claim 17, wherein one of said first and second regions having a smaller material thickness is at least partially structured, and the other of said first and second regions is substantially smooth.

19. The metallic layer according to claim 17, wherein said first and second regions have said structures.

20. The metallic layer according to claim 17, which further comprises at least one folded over end region.

21. The metallic layer according to claim 17, wherein at least one of said first and second regions is formed of a material through which a fluid can at least partly flow.

22. The metallic layer according to claim 17, wherein said material through which a fluid can at least partly flow is a metallic fiber material.

23. The metallic layer according to claim 17, wherein said first and second regions at least partially overlap one another in an overlap region.

24. The metallic layer according to claim 23, wherein said first and second regions are connected to one another in said overlap region by a thermal joining process.

25. The metallic layer according to claim 24, wherein said thermal joining process is at least one process selected from the group consisting of welding, roll seam welding and brazing.

26. The metallic layer according to claim 23, wherein said first and second regions are connected to one another in said overlap region by a mechanical joining process.

27. The metallic layer according to claim 26, wherein said mechanical joining process is riveting.

28. The metallic layer according to claim 17, wherein said structures are at least partially stamped.

29. The metallic layer according to claim 28, wherein said structures are formed by corrugating and then stamping.

30. The metallic layer according to claim 17, wherein said structures are formed by stepped corrugating.

31. The metallic layer according to claim 17, wherein said corrugations have at least one shape selected from the group consisting of sinusoidal, triangular and square.

32. The metallic layer according to claim 31, wherein said corrugations have different structures in said first region and in said second region.

33. A honeycomb body, comprising:
    metallic layers produced by the process according to claim 1.

34. A honeycomb body, comprising:
    metallic layers produced according to claim 17.

* * * * *